(12) United States Patent
Ohmori et al.

(10) Patent No.: US 7,106,528 B2
(45) Date of Patent: Sep. 12, 2006

(54) METHOD AND APPARATUS FOR MANUFACTURING LARGE DOUBLE-SIDED CURVED FRESNEL LENS

(75) Inventors: Hitoshi Ohmori, Wako (JP); Yoshihiro Uehara, Wako (JP); Yoshiyuki Ueno, Wako (JP); Yutaka Yamagata, Wako (JP); Shinya Morita, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/496,151

(22) PCT Filed: Dec. 3, 2002

(86) PCT No.: PCT/JP02/12628

§ 371 (c)(1),
(2), (4) Date: May 20, 2004

(87) PCT Pub. No.: WO03/047833

PCT Pub. Date: Jun. 12, 2003

(65) Prior Publication Data

US 2005/0007682 A1    Jan. 13, 2005

(30) Foreign Application Priority Data

Dec. 4, 2001    (JP) ............................. 2001-370052

(51) Int. Cl.
*G02B 3/08* (2006.01)
(52) U.S. Cl. ...................... 359/742; 359/743; 359/748; 264/2.2; 264/2.7; 264/313; 264/316
(58) Field of Classification Search ................ 359/742, 359/743, 748; 264/1.32, 2.2, 2.7, 293, 313, 264/316
See application file for complete search history.

(56) References Cited

U.S. PATENT DOCUMENTS

| 5,098,184 A | 3/1992 | van den Brandt et al. |
| 6,025,064 A * | 2/2000 | Kawata et al. ........... 428/304.4 |
| 6,315,937 B1 * | 11/2001 | Takeuchi et al. ............ 264/293 |

FOREIGN PATENT DOCUMENTS

| JP | 57-109618 | 7/1982 |
| JP | 2-32301 A | 2/1990 |
| JP | 2-133327 A | 5/1990 |
| JP | 5-169464 A | 7/1993 |

(Continued)

OTHER PUBLICATIONS

International Search Report, completed Mar. 4, 2003.

*Primary Examiner*—Ricky Mack
*Assistant Examiner*—Brandi Thomas
(74) *Attorney, Agent, or Firm*—Griffin & Szipl, P.C.

(57) ABSTRACT

A method of manufacturing a large double-sided curved Fresnel lens. The method includes a machining step (A) of performing ultra-precise three-dimensional machining on an upper mold and a lower mold to each have an upper transfer surface and a lower transfer surface engaging an upper surface and a lower surface of a thermoplastic resin plate, respectively. Further, the method includes a hot press molding step (B) of pressing the thermoplastic resin plate between the upper and lower molds by a predetermined pressure with the resin plate being held at a temperature higher than a softening temperature thereof and lower than a melting temperature thereof so that the thermoplastic resin plate is curved, and both lens surfaces for the double-sided Fresnel lens are respectively transferred to an upper surface and a lower surface of the thermoplastic resin plate.

6 Claims, 7 Drawing Sheets

FOREIGN PATENT DOCUMENTS

| | | |
|---|---|---|
| JP | 6-114860 A | 4/1994 |
| JP | 7-148857 A | 6/1995 |
| JP | 9-216232 A | 8/1997 |
| JP | 2001-91718 A | 4/2001 |

* cited by examiner

METHOD AND APPARATUS FOR MANUFACTURING LARGE DOUBLE-SIDED CURVED FRESNEL LENS

This is a National Phase Application in the United States of International Patent Application No. PCT/JP02/12628 filed Dec. 3, 2002, which claims priority on Japanese Patent Application No. 370052/2001 filed Dec. 4, 2001. The entire disclosures of the above patent applications are hereby incorporated by reference.

BACKGROUND OF THE INVENTION

1. Field of the Invention

The present invention relates to a method and apparatus for manufacturing a large, double-sided, curved Fresnel lens that has a Fresnel groove on each surface.

2. Description of the Related Art

Figure 1A:
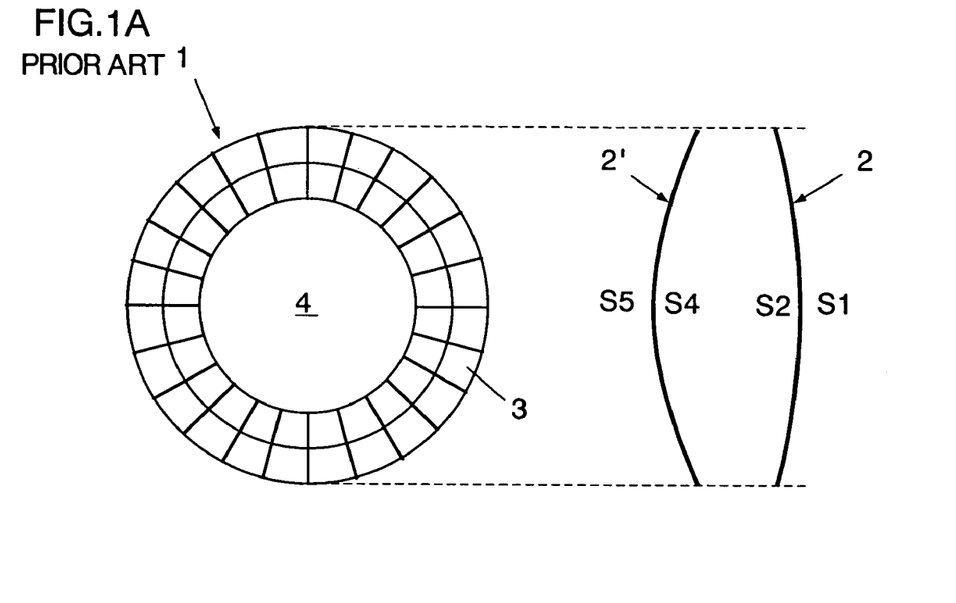
FIGS. 1A, 1B and 1C are illustrations showing a structure of a large, double-sided, curved Fresnel lens related to the present invention.

FIG. 1A schematically shows a large, double-sided, curved Fresnel lens. It is proposed to use an optical system having two large, double-sided, curved Fresnel lenses 2 and 2' for imaging in-order to observe light (Cherenkov radiant ray) generated from high-energy particles at the time the high-energy particles fall in the atmosphere from outside the earth. By observing Cherenkov radiant ray, it is possible to measure strength, a wavelength and energy of an elementary particle that falls to the earth.

The large, double-sided, curved Fresnel lenses 2 and 2' are launched together with a space shuttle into a stationary orbit of the earth to observe elementary particles at the range corresponding to the area of a diameter of about 600 km on the earth's surface. A very wide-sighted refractive optical system that can measure elementary particles includes two large, double-sided, curved Fresnel lenses 2 and 2' each of which has a diameter of 2500 mm. One Fresnel lens 2 includes two spherical surfaces S1 and S2 that have radii of 4099 mm and that are separated from each other by the distance of 20 mm in the optical axis direction. Fresnel grooves are formed on the surfaces S1 and S2, respectively.

The other Fresnel lens 2' includes two spherical surfaces S4 and S5 that have radii of 2555 mm and that are separated from each other by the distance of 20 mm in the optical axis direction. Fresnel grooves are formed on the surfaces S4 and S5.

In order to manufacture the large, double-sided, curved Fresnel lenses 2 and 2' having the diameters of 2500 mm, it is necessary to prepare a ultra-precise machining apparatus having a large rotary table of which diameter is no smaller than 2500 mm. Further, in the future, when a further larger, double-sided, curved Fresnel lens is required, the ultra-precise machining apparatus has to be made larger in size. In addition, a reinforcing tool needs to be attached to the large lens to increase the lens strength. Therefore, it is not easy and realistic to develop such a large ultra-precise machining apparatus.

Figure 1B:
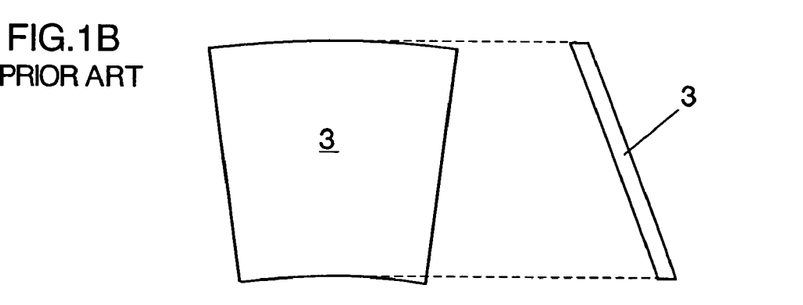

For this reason, as schematically shown in FIGS. 1A and 1B, it is assumed to divide the large, double-sided, curved Fresnel lenses 2 and 2' into a plurality of segment lenses 3. That is, it can be considered to manufacture a predetermined number of segment lenses 3 having specific sizes. In this example, three or four types of segment lenses 3 needs to be manufactured.

Specifically, in the example of FIG. 1A, each of the two lenses 2 and 2' are assembled by arranging a center lens 4 having a diameter of 1500 mm, twenty-four inside tablet slice segment lenses 3 and twenty-four outside tablet slice segment lenses 3 each of which corresponds to a circle part equally divided from one circle by 15 degrees. In this manner, by manufacturing small components and putting them together, it is possible to ease transportation difficulty arising when one large Fresnel lens is manufactured.

Figure 1C:
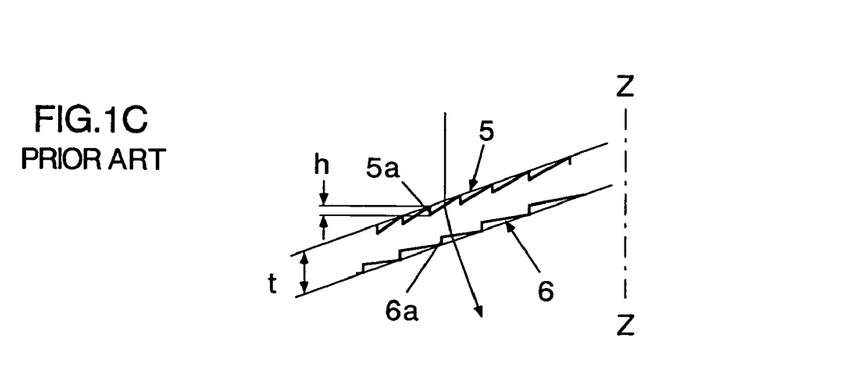

One tablet slice segment lens 3 needs to be formed such that the back sides 5a and 6a of the Fresnel lens surfaces 5 and 6 have uniform heights of 1 mm, and the segment lens 3 needs to have an entirely uniform thickness "t" of 20 mm in the direction of the lens optical axis Z. Further, the lens 3 needs to have an entire shape of a surface of revolution around the optical axis Z, and the optical axis Z of the Fresnel surface at the front side needs to conform to the optical axis Z of the Fresnel surface at the back side. Additionally, the height of the back sides 5a and 6a of the lens 3 is indicated by "h" of FIG. 1C.

Furthermore, the Fresnel lens is required to have high transparency, highly precise Fresnel lens groove, and high lens quality because of its use application.

The Fresnel lens has the structure in which refractive surfaces are distributed to narrow band-shaped regions with the refractive surfaces being flat. Since the outline of the Fresnel lens is thin plate-shaped, it is advantageous to make good use of a small volume and light weight of the Fresnel lens. A mold having Fresnel lens transfer groove engraved on the flat surface thereof is used together with a flat plate for sandwiching a Fresnel lens material between the mold and the flat plate to fabricate the Fresnel lens by heat pressing. Accordingly, the Fresnel lens is formed on the one side surface of the material.

Recently, in order to take more advantage of characteristics of the thin plate-shaped Fresnel lens and more freely design the Fresnel lens, it has been desired to form the Fresnel lenses on both sides of a curved plate. Two plate materials each of which has the Fresnel lens surface on one side thereof are combined to each other on the other flat surfaces thereof to assemble a thin, flat, double-sided, plate-shaped Fresnel lens.

However, there has not been a mold by which the Fresnel grooves are formed on both sides of a curved plate. Accordingly, it has been difficult to produce a curved lens having Fresnel grooves on both sides thereof.

SUMMARY OF THE INVENTION

The present invention was made to satisfy the above desires. It is an object of the present invention to provide a method and apparatus for precisely manufacturing a tablet slice segment lens that constitutes a large, double-sided, curved Fresnel lens with the segment lens being highly transparent.

According to the present invention, there is provided a method of manufacturing a large double-sided curved Fresnel lens, comprising; a machining step (A) of performing ultra-precise three-dimensional machining on a material to make an upper mold having an upper transfer surface that engages an upper surface of a thermoplastic resin plate, and performing ultra-precise three-dimensional machining-on a material to make a lower mold having a lower transfer surface that engages a lower surface of the thermoplastic resin plate; and a hot press molding step (B) of pressing the thermoplastic resin plate between the upper and lower molds by a predetermined pressure with the resin plate being held at a temperature higher than a softening temperature thereof and lower than a melting temperature thereof so that the thermoplastic resin plate is curved, and both lens surfaces for the double-sided Fresnel lens are respectively transferred to the upper surface and the lower surface of the thermoplastic resin plate.

Further, according to the present invention, there is provided an apparatus that manufactures a large double-sided curved Fresnel lens, comprising: an upper mold having an upper transfer surface that engages an upper surface of a thermoplastic resin plate; a lower mold having a lower transfer surface that engages a lower surface of the thermoplastic resin plate; and a hot press machine that holds the thermoplastic resin plate at a temperature higher than a softening temperature thereof and lower than a melting temperature thereof, and presses the held thermoplastic resin plate between the upper and lower molds by a predetermined pressure to curve the thermoplastic resin plate and transfer both lens surfaces for the double-sided Fresnel lens to the upper and lower surfaces of the thermoplastic resin plate,-respectively.

In the method and apparatus, the upper mold has the upper transfer surface that engages the upper surface of the resin plate, and the lower mold has the lower transfer surface that engages the lower surface of the resin plate. The thermoplastic resin is pressed between the upper mold and the lower mold so that the resin plate can be curved, and at the same time, both lens surfaces for the double-sided Fresnel lens can be transferred to the upper and lower surfaces of the resin plate. Thereby, it is possible to efficiently manufacture the double-sided curved Fresnel lens.

Furthermore, the thermoplastic resin plate held at a temperature higher than the softening temperature and lower than the melting temperature is pressed by a predetermined pressure. Thereby, a small roughness of the lens surface can be obtained, achieving high transparency. Therefore, it is possible to obtain a lens function of high performance.

In the above method, in the machining step (A), preferably, shapes of back sides of the double-sided Fresnel lens are respectively formed in the upper transfer surface and the lower transfer surface approximately in a direction parallel to the rotational axis. Thereby, it is possible to decrease molding resistance when shaping the back side part in the resin plate by the hot pressing. Furthermore, it is possible to suppress the flow of the resin plate with high precision.

Furthermore, according to the present invention, there is provided an apparatus that manufactures a mold for a large double-sided curved Fresnel lens, comprising: a rotary table that is rotated around a rotational axis parallel to an optical axis of the large double-sided curved Fresnel lens at a high speed; a machining tool that machines a mold material placed on the rotary table; and an ultra-precise machining device that numerically controls a position of the machining tool in first and second directions orthogonal to the rotational axis and in a third direction parallel to the rotational axis.

In this apparatus, the rotary table is rotated around the rotational axis at a high speed. Thereby, compared to a conventional three-axis numerical control machining, it is possible to raise a mold machining speed to several meters per minute while maintaining high precision. Therefore, it is possible to fabricate the mold that has a mirror finished surface roughness of about Ry 100 nm, improving transparency of the double-sided Fresnel lens made by this mold.

Moreover, according to the present invention, there is provide an apparatus that manufactures a large double-sided Fresnel lens, comprising: molds each having a Fresnel facet for the large double-sided Fresnel lens; and a press machine that simultaneously presses both surfaces of a thermoplastic resin plate by the molds with the thermoplastic resin plate being held at a temperature higher than a softening temperature thereof and lower than a melting temperature thereof.

Furthermore, the above apparatus preferably comprises: mold frames to which the molds are fixed, respectively; a stroke guide that guides a press stroke in an optical direction of the Fresnel lens such that the molds move to and from each other in the optical direction; and a stroke limiter that controls the press stroke.

In this apparatus, the upper and lower molds are installed on the press machine, and the upper and lower molds are separated from each other by the stroke of the press machine. Then, the thermoplastic resin plate that has been heated to a temperature higher than the softening temperature and lower than the melting temperature is placed between the upper mold and the lower mold, and the upper mold and the lower mold are moved to approach each other in the direction of the optical axis by the stroke of the press machine. When the stroke reaches the position of the stroke limiters, the movement of the upper and lower molds is stopped. At this time, the facets of the upper and lower molds are transferred to both surfaces of the thermoplastic resin plate. The molds and the resin plate are held in this state until the molds and the resin plate are cooled to a room temperature. Thereafter, the molds are separated to obtain the product for the double-sided Fresnel lens to both sides of which the Fresnel grooves are respectively transferred.

Other objects, advantages and features of the present invention will become apparent from the following description with reference to the attached drawings.

DESCRIPTION OF THE PREFERRED EMBODIMENTS

In the following, a preferred embodiment of the present invention will be described with reference to the drawings. The same reference numerals are attached to the same parts in the drawings.

Figure 2A:
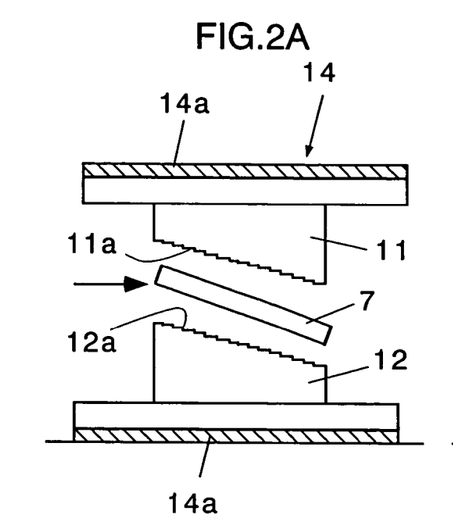
FIGS. 2A and 2B show an apparatus for manufacturing the large, double-sided Fresnel lens according to an embodiment of the present invention.
Figure 2B:
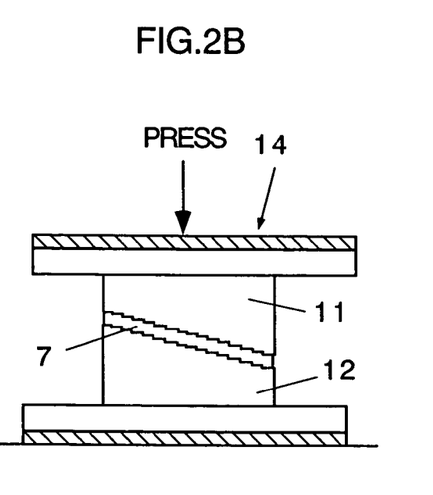

FIGS. 2A and 2B show an apparatus for manufacturing a large, double-sided, curved Fresnel lens according to an embodiment of the present invention. The double-sided Fresnel lens means a lens that has Fresnel grooves on both sides thereof. FIG. 2A shows a state before pressing, and FIG. 2B shows a state after pressing. The manufacturing apparatus of FIGS. 2A and 2B thermally presses a segment lens, and has an upper mold 11, a lower mold 12, and a hot press machine 14.

The upper mold 11 has an upper transfer surface 11a that engages an upper surface of a resin plate 7 for a tablet slice segment lens 3 divided from a large, double-sided, curved Fresnel lens 2 or 2' shown in FIG. 1A. The lower mold 12 has a lower transfer surface 12a that engages a lower surface of the resin plate 7.

The hot press machine 14 has a heater plate 14a, maintains the temperature of the transparent thermoplastic resin plate 7 to be higher than the softening temperature of the plate 7 and lower than the melting temperature of the plate 7, and presses the resin plate 7 sandwiched between the upper and lower molds 11 and 12 by a predetermined pressure. By this press operation, the resin plate 7 is curved to have a desired shape, and the Fresnel lens surfaces 5 and 6 are transferred to the upper and lower surfaces of the resin plate 7, respectively.

The thermoplastic resin plate 7 is preferably PMMA (polymethylmethacrylate). PMMA is a transparent thermoplastic resin that is formed by polymerizing methylmethacrylate. PMMA has a refractive index of 1.48 to 1.52, a softening temperature of 71 degrees centigrade to 107 degrees centigrade, and fine optical characteristics.

A method of manufacturing the large, double-sided, curved Fresnel lens according to the embodiment of the present invention is performed by using the apparatus shown in FIGS. 2A and 2B, and includes an ultra-precise three-dimensional machining step (A) and a hot press molding step (B).

In the ultra-precise three-dimensional machining step (A), the upper mold 11 and the lower-mold 12 are fabricated by ultra-precise three-dimensional machining so as to have the upper transfer surface 11a and the lower transfer surface 12a, respectively.

In the hot press molding step (B), the temperature of the transparent thermoplastic resin plate 7 is maintained to be higher than the softening temperature and lower than the melting temperature, the resin plate 7 is pressed between the upper and lower molds 11 and 12 by the predetermined pressure so that the resin plate 7 can be curved, and the lens surfaces for the segment lens 3 can be transferred to both sides of the resin plate 7, respectively.

In the case where the thermoplastic resin 7 is PMMA (polymethylmethacrylate), a temperature higher than the softening temperature and lower than the melting temperature ranges from 150 degrees centigrade to 180 degrees centigrade, for example. Accordingly, before pressing, the upper and lower molds 11 and 12 are heated to a temperature of 150 degrees centigrade to 180 degrees centigrade, and the resin plate 7 is also preheated to a temperature approximately equivalent to the temperature of the molds 11 and 12. When the temperature of the heated molds 11 and 12, and resin plate 7 is too low, the molding resistance becomes too large, and the surface becomes rougher. On the other hand, when the temperature of the heated molds 11 and 12, and resin plate 7 is too high, the softened material of the resin plate 7 becomes more fluid, so that the shape precision is deteriorated.

The predetermined pressure for pressing is 20 tons to 100 tons in the above example, and this pressure corresponds to a surface pressure of about 0.02 t/cm$^2$ to 0.1 t/cm$^2$. Further, after the pressing, in the state where the resin plate 7 is pressed, the molds 11 and 12, and the resin plate 7 are gradually cooled to a normal temperature. This gradual cooling in the pressed state enables highly precise molding.

Before the hot press molding step (B), the similar heat pressing step may be performed to only curve the resin plate 7. Alternatively, by other methods other than the heat pressing, only the curving of the resin plate 7 may be performed in advance.

Figure 3A:
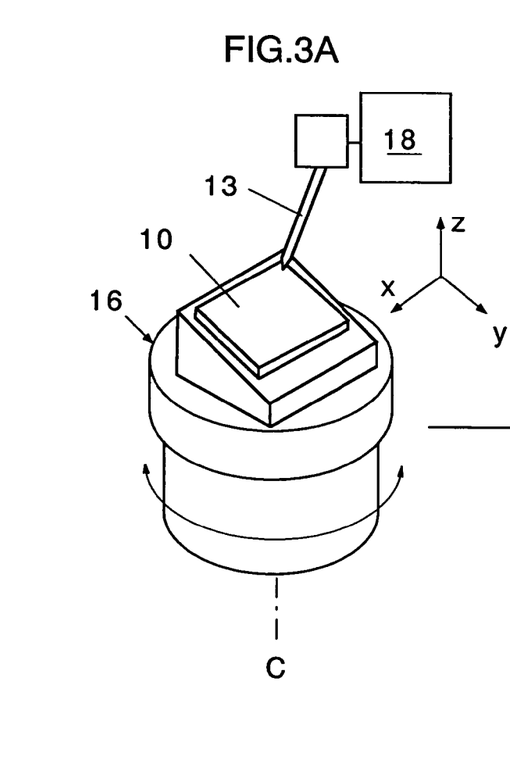
FIGS. 3A and 3B show an apparatus for fabricating a mold for the large, double-sided Fresnel lens according to the embodiment of the present invention.
Figure 3B:
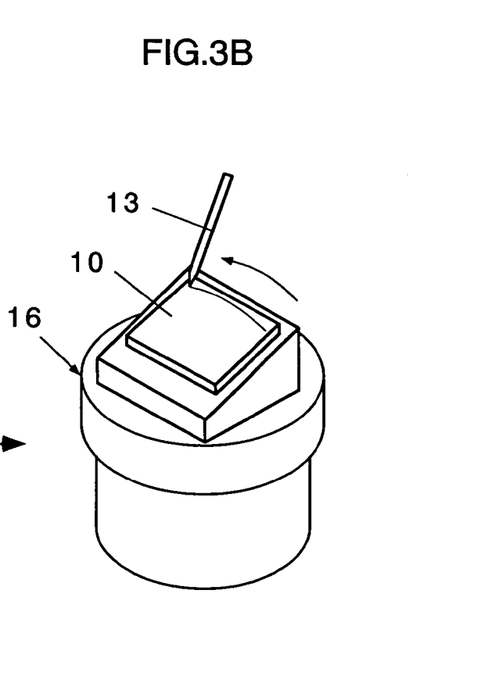

FIGS. 3A and 3B show an apparatus for manufacturing the upper and lower mold 11 and 12 for the large, double-sided, curved Fresnel lens according to the embodiment of the present invention. FIG. 3A shows a state before the machining, and FIG. 3B shows a machining state. This manufacturing apparatus three-dimensionally machines a mold with very high precision, and includes a rotary table 16 and an ultra-precise machining device 18.

The rotary table 16 rotates a mold material 10 at a high speed around a rotational axis C parallel to the optical axis of the large, double-sided, curved Fresnel lenses 2 and 2'. The ultra-precise machining device 18 numerically controls a machining tool 13 in the directions of the axes X and Y orthogonal to the axis C and in the axis Z direction parallel to the axis C. A sintered diamond bite or a single-crystalline diamond bite is used as the machining tool 13.

In the method according to the embodiment, in the ultra-precise three-dimensional machining step (A), by using the apparatus of FIGS. 3A and 3B, the mold material 10 is rotated at a high speed around the axis C parallel to the optical axis of the large, double-sided, curved Fresnel lenses 2 and 2', and the machining tool 13 is numerically controlled in the directions of the axes X and Y orthogonal to the axis C and in the direction of the axis Z parallel to the axis C so that the mold material 10 can be engraved to have the transfer surfaces 11a and 12a.

Figure 4:
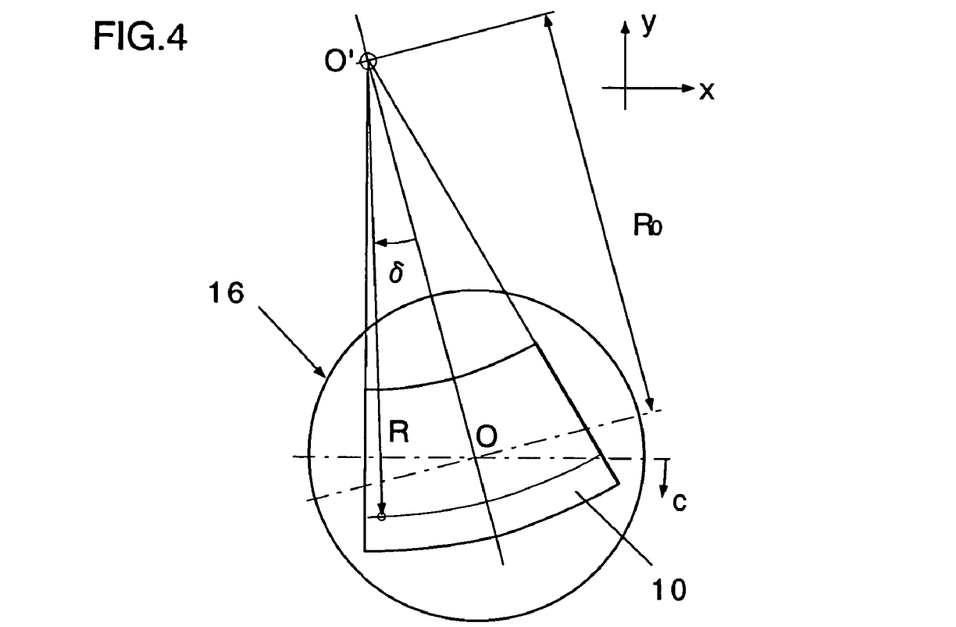
FIG. 4 is an illustration schematically showing position control according to the embodiment of the present invention.

FIG. 4 schematically shows the position control of this method according to the embodiment of the present invention. As shown in FIG. 4, "O" represents a rotational center of the rotary table 16, "O'" represents the center of the double-sided Fresnel lens, "$R_0$" represents the distance between the center O and the center O', "f(r)" represents a shape (e.g., sphere) of a lens base, and "δ" represents a displaced angle around the center O' of the double-sided Fresnel lens. The position control with respect to the axes X, Y and Z and the rotational axis C is performed based on the following equations:

$$X = R \sin δ - R_0 \sin δ \tag{1}$$

$$Y = -R \cos δ + R_0 \cos δ \tag{2}$$

$$Z = f(R) - f(R_0) \tag{3}$$

$$c = -δ \tag{4}$$

The mold material 10 is a material for the upper mold 11 and the lower mold 12, and is preferably a very hard material such as a metal suitable to the press molding. The position control of the three-axis numerical control in the directions of the axes X, Y and Z is preferably performed at speed of about 1 m/min to 2 m/min while maintaining high position precision of about 10 nm. On the other hand, the position control of the axis C is performed at a higher speed, preferably, at a speed of 1 rpm to 3 rpm (360 deg/min to 1080 deg/min) corresponding to the peripheral velocity of several meters per minute. Preferably, the numerical control for the axis C is also performed at the same time the numerical control for the directions of the axes X, Y and Z is performed. However, as long as the position control for the axis C can be synchronized with the position control for the axes X, Y and Z, it is not necessary to perform the numerical position control for the axis C.

In the case of the conventional three-axis numerical control machining, when high position precision is maintained, a moving speed of the machining tool 13 ranges from about 1 m/min to 2 m/min. Accordingly, such a low speed machining can produce only a rough surface and cannot produce a smooth surface. However, according to the embodiment of the present invention, the mold material is rotated at a high speed around the axis C by the rotary table 16, so that the speed of machining the mold material can be raised to a speed equal to or higher than several meters per minute with high precision being maintained, compared to the conventional three-axis numerical control machining. In this manner, it is possible to produce the mold of which machined surface has a mirror-like roughness of about Ry 100 nm.

Furthermore, according to the embodiment of the present invention, without using a large rotary table having a rotational center that corresponds to the center O' of the double-sided Fresnel lens, the small rotary table 16 having the rotational center O shown in FIG. 4 is used in the four-axis control. Thereby, it is possible to achieve the machining of a groove having any shape such as a concentric Fresnel groove of the large Fresnel lens.

In addition, in the ultra-precise three-dimensional machining step (A), the mold is manufactured such that the shapes of the back sides 5a or 6a of the Fresnel lens are formed on the transfer surface of the mold approximately in parallel with the axis C. In other words, by forming the back sides 5a and 6a in parallel with the optical axis of the large, double-sided, curved Fresnel lens 2 or 2', the back sides 5a and 6a are directed in the molding direction at the time of the heat pressing so that the molding resistance can be decreased, the resin flow can be suppressed, and the large, double-sided, curved Fresnel lens can be molded with high precision.

FIRST EXAMPLE

Next, a first example of the present invention will be described.

A lens material of the large, double-sided, curved Fresnel lens shown in FIG. 1A is an ultraviolet ray transparency grade plate made of PMMA (polymethylmethacrylate) and having a thickness of 20 mm. In this example, a plate material made of oxygen-free copper was three-dimensionally machined with very high accuracy to fabricate a mold 11, and then, this mold 11 was used to transfer Fresnel surface on a lens material for a tablet slice segment lens 3 by taking advantage of the thermoplastic property of the lens material.

An overall size of the tablet slice segment lens 3 was cut out from the PMMA material, and the cut lens material for the segment lens 3 was preheated in a furnace. Thereafter, the heated lens material was thermally pressed by using the mold 11 attached to the hot press machine to transfer the spherical surface and the Fresnel lens shape on the lens material. Then, the lens material was taken from the hot press machine, and cooled. After cooling, an excess part was cut off from the pressed lens material.

The ultra-precise mold for hot press molding needs to be fabricated for each of the four types of the segment lenses, but the basic structure of the mold for each type of the segment lens is the same. These molds were designed and fabricated by taking into account the following matters (1) to (4).

(1) For the Fresnel groove on the both sides of the material (regarding a mechanism for aligning the upper position and the lower position), the consideration was given to smooth movement in the operational temperature range of the hot press molding, an appropriate clearance between a guide post and a guide bush, material selection of the guide post and the guide bush, a coefficient of thermal expansion of the guide relative to the position pitch, and designing of the guide post and the guide push.

(2) For the curved shape (regarding a locking mechanism), the consideration was given to smooth movement in the operational temperature range of the hot press molding, an appropriate countermeasure for component force generated at the time of the hot press molding, maintaining of a free state at the time of starting the press molding, a locking mechanism that starts to function from a position where the displacement is generated, and complete receiving of the displacement at the time of finishing the pressing.

(3) For an uneven thickness (regarding a temperature adjusting mechanism), the consideration was given to a stable temperature management in the operational temperature range of the hot press molding.

(4) For precise hot press molding (regarding a spacer mechanism), the consideration was given to different processes for the uneven thickness and the both-side Fresnel grooves.

The Fresnel transfer surface of the mold was machined by using a large ultra-precise machining apparatus. Thereby, the mold was fabricated and adjusted. A diamond bite and a machining jig were designed and fabricated, and an NC program was created. Thereby, the ultra-precise mirror finish cutting was performed to form the Fresnel lens transfer surface. The process of this ultra-precise mirror finish cutting was divided into a rough cutting process and a finish cutting process that were performed by a sintered diamond bite and a single crystalline diamond bite, respectively. In this manner, the precise mirror surface having surface roughness of Ry 100 nm was obtained.

Then, Ni-coating process was performed on the thus-machined Fresnel transfer lens surface to prevent generation of corrosion. The thickness of this Ni-coating was about 4 μm, and the surface roughness was degraded to about Ry 150 nm.

In the hot press, the temperature is not raised to a degree of the temperature of injection molding that melts a resin to be fluid. The hot press is a molding method that uses pressing fluidity (plastic deformation) in the softened state. Compared to the injection molding, in the hot press, temperature range between the heating and cooling is narrower than in the injection molding, and the temperature raising and lowering rate of the heating and the cooling is smaller than in the injection molding. Accordingly, the product made by the hot press has smaller inside remaining stress due to the heat and becomes more homogeneous. However, in the hot press, it is difficult to perform greatly deforming molding in which the molding cannot be performed unless the material is greatly fluid and deformed. Furthermore, if the Fresnel facet engraved by mirror finish cutting is thermally transferred to the lens material completely by a high pressure (transfer rate is 100%), it becomes difficult to remove the lens material adhering to the mold from the mold.

Conventionally, in the case of manufacturing the Fresnel lens by the thermal transfer, the base shape of the lens is plane, the notching pitch is equal to or smaller than 0.5 mm (the height of the back side is also equal to or smaller than 0.5 mm), and the Fresnel lens surface is formed on only the one side. Furthermore, a remaining thermal stress is generated in the material when molding the material into a plate shape, and deformation size change is generated, accompanying release of the remaining thermal stress when heating for the hot press molding. Therefore, it is necessary to correct the mold shape.

On the other hand, in this example of manufacturing the large, double-sided, curved Fresnel lens, the height of the back side of the Fresnel lens needs to be uniformly 1 mm, the thickness of the lens in the optical axis direction needs to be uniformly 20 mm over the entire surface, the lens needs to have a shape of a spherical surface, and the optical axis of the Fresnel surface formed on the one side needs to conform to the optical axis of the Fresnel surface formed on the other side. In other words, a deep groove of which back side height is 1 mm needs to be transferred, and in order to form the uniform lens thickness of 20 mm in the optical axis direction, the thickness in the direction vertical to the lens surface needs to change depending on the radial position of the lens, that is, the plate material having uniform thickness of 20 mm needs to be deformed to have an uneven thickness in the direction vertical to the surface. Furthermore, it is necessary to take into account deforming of the spherical surface shape due to thermal contraction, and the spherical radius change (deforming of the spherical surface) due to the weight of the lens itself when the lens is removed from the mold.

Taking the above-described matters into account, the molding experiment was performed. In this experiment, the segment lens was made by the hot press molding. This segment lens had a fine surface roughness and very high transparency. Further, it was confirmed that the Fresnel lens groove was transferred to the segment lens with high precision. In addition, from the image formed by the lens, it was confirmed that the lens had the high precision lens function.

In the following, the hot press machine for the segment lens shown in FIGS. 2A and 2B that was used in the first and second example will be described in detailed.

Figure 5:
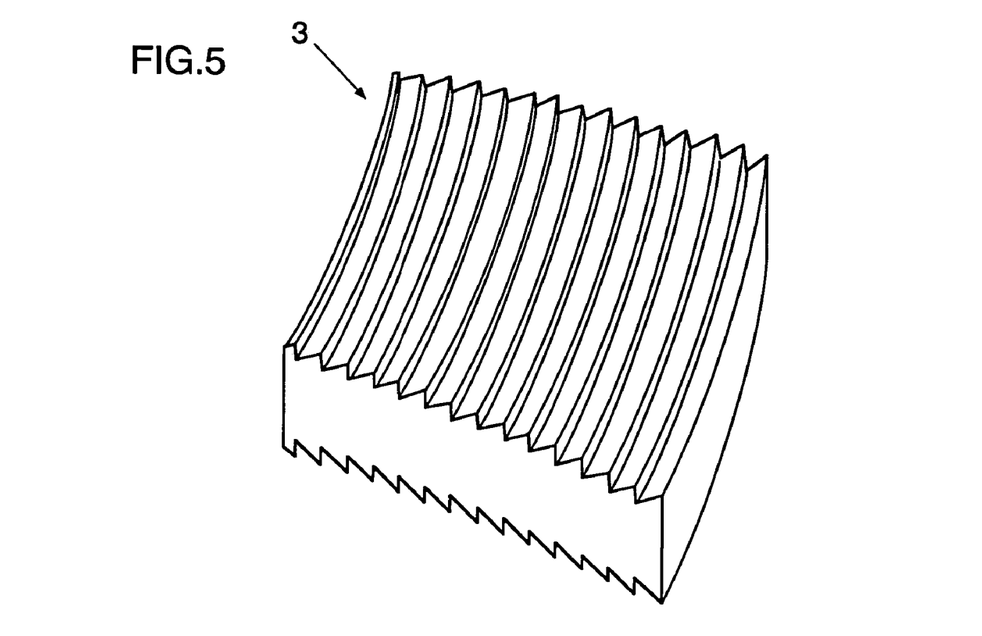
FIG. 5 is a perspective view showing a segment of a double-sided, spherical Fresnel lens having inhomogeneous thickness.

FIG. 5 is a perspective view showing one example of a Fresnel lens. This Fresnel lens of FIG. 5 has features that this lens is a double-sided Fresnel lens segment, and the standard surfaces of the both sides of the lens are spherical, and this lens is one of a plurality of segment lenses that are assembled to form one Fresnel lens.

Figure 6:
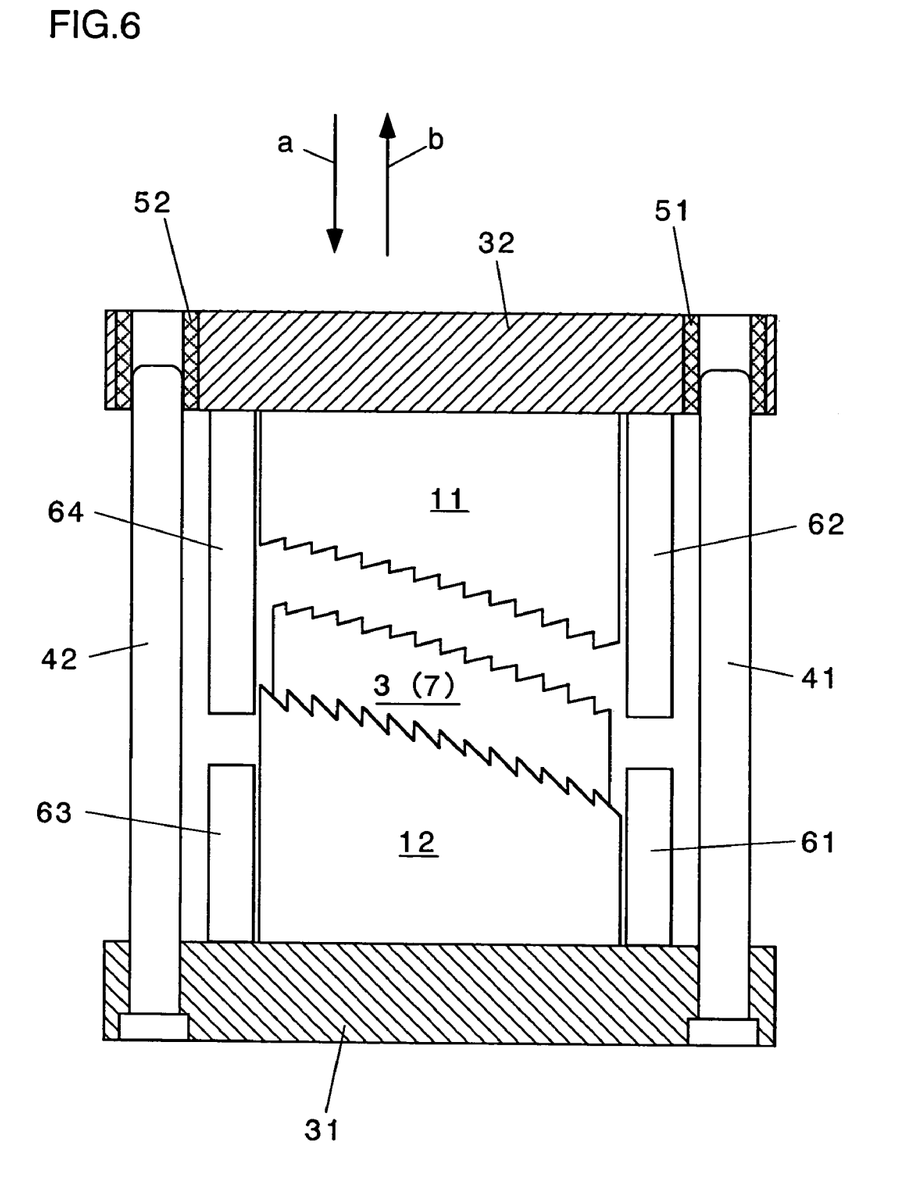
FIG. 6 is a sectional view of a mold apparatus for the double-sided Fresnel lens according to a first example of the present invention.

FIG. 6 is a sectional view of a mold apparatus for the double-sided Fresnel lens according to a first example of the present invention. In FIG. 6, the reference numeral 3 designates the double-sided Fresnel lens shown in FIGS. 5, 11 and 12 the upper mold and the lower mold for transferring the Fresnel facets, respectively, 31 and 32 frame plates for the upper and lower molds that are integrally fixed to the upper and lower molds, respectively. Further, in FIG. 6, the reference numerals 41 and 42 designate guide pins for controlling the mold opening/closing direction, respectively, 51 and 52 guide bushes that engages the guide pins 41 and 42, respectively, and 61, 62, 63 and 64 stroke limiters for controlling the press stroke end. The guide pins 41 and 42 inserted and fixed to the frame plate 31 are engaged by the guide bushes 51 and 52 inserted and fixed to the frame plate 32 such that a small gap exists between the guide pin 41 and the guide bush 51 and between the guide pin 42 and the guide bush 52, and the guide pins 41 and 42 can move smoothly.

A mold apparatus shown in FIG. 6 are structured for the double-sided Fresnel lens. Accordingly, to operate the mold apparatus of FIG. 6, a press machine (not shown in the drawing) is used that includes two pressing plates. The pressing plates lineally moves forward and backward, and have respective flat surfaces vertical to the forward and backward moving directions of the pressing plates. The pressing plates are fixed at the bed side and the ram side. The mold for the double-sided Fresnel lens is placed between the two pressing plates, the frame plate 31 is fixed to one pressing plate of the press machine, and the frame plate 32 is fixed to the other pressing plate of the press machine. Thereby, it is possible to open and close the mold apparatus for the double-sided Fresnel lens by the stroke of the press machine.

In FIG. 6, the arrows "a" and "b" designate the closing direction and the opening direction. To mold the double-sided Fresnel lens made of a thermoplastic transparent resin by using the double-sided Fresnel lens mold apparatus installed in the press machine, the following processes are performed. The molds 11 and 12 are separated from each other by the stroke of the press machine to open the mold apparatus in the direction "b". Then, the thermally softened thermoplastic transparent resin plate 7 is placed between the molds 11 and 12. In the state where the resin plate is soft, the press machine is promptly operated to close the mold apparatus in the direction "a" so that the resin plate 7 can be sandwiched and pressed by the molds 11 and 12. As a result, the resin plate 7 is entirely curved into a spherical surface shape, and the Fresnel facet is transferred on each side of the resin plate. A thickness of the molded product can be controlled by the stroke limiters 61 and 62, and the stroke limiters 63 and 64. In the state where the stroke of the press machine is pressed and extended up to the position of the stroke limiters, the resin plate is held until the resin is cooled and hardened to obtain the double-sided Fresnel lens 3.

In the above example, means for heating and cooling the molds 11 and 12 are described. However, in order to maintain the molds 11 and 12 in an appropriate heated state at the time of pressing, it is preferable to incorporate a heating component (device), a thermal insulation component, a temperature sensor, and the like in an appropriate part such as the pressing plates of the press machine to perform temperature control. Furthermore, in the case where the molded product (double-sided Fresnel lens segment) and the molds are cooled faster than natural heat release, an air flow hole is formed at an appropriate part such as the molds, the frame plates, and the pressing plates of the press machine to enable a cooling medium to flow through the hole.

According to the above example, a thickness of the thermoplastic resin plate before pressing is determined based on heating condition, a resin material, and pressing force that is applied when the stroke of the press machine is completely extended up to the stroke limiters of the mold so as to obtain the appropriately transferred Fresnel lens having a predetermined thickness. Further, in the case of fabricating a double-sided Fresnel lens that has inhomogeneous thickness, it is preferable to use a thermoplastic resin plate that has the corresponding, inhomogeneous thickness distribution. The condition of temperature of the mold and the thermoplastic resin at the time of the pressing, and the condition of a pressing speed and a pressing force are appropriately determined in accordance with a material of the thermoplastic resin plate.

SECOND EXAMPLE

In addition to the first example, another hot press molding experiment was performed in which materials other than PMMA (polymethylmethacrylate) was used as a transparent thermoplastic resin plate 7. TPX (polymethylpentene made by Mitui Kagaku Inc.), Cytop (a fluorinated resin made by Asahi Garasu Inc.), and ZEONEX (cycloolefin resin made by Nihhon Zeon Inc.) were used as the materials other than PMMA.

1. TPX

Figure 7:
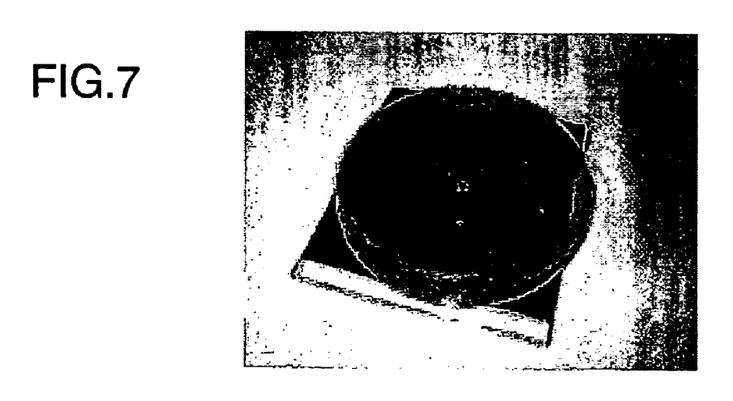
FIG. 7 is a photograph showing an appearance of a TPX material.

Pellets of TPX was put in a heat insulation glass beaker, and melted in a vacuum dry furnace to make the TPX material for testing shown in FIG. 7. An annealing process for 100 minutes was performed on this TPX material in a dry furnace in which heated air of 180 degrees centigrade flowed. As a result, the entire surface of the TPX material became yellow-tinged and sticky. However, the hardness of the TPX material did not change, and was equal to the hardness at a normal temperature. A test at a temperature higher than 180 degrees centigrade was not performed because the surface became sticky at 180 degrees centigrade.

2. Cytop

Figure 8A:
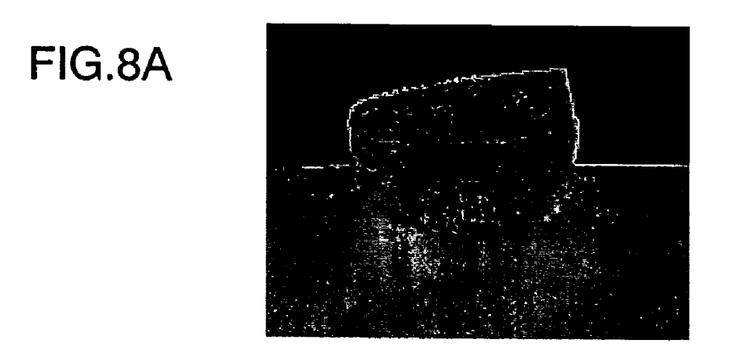
FIGS. 8A and 8B are illustrations showing an appearance before pressing, and an appearance after pressing, respectively.
Figure 8B:
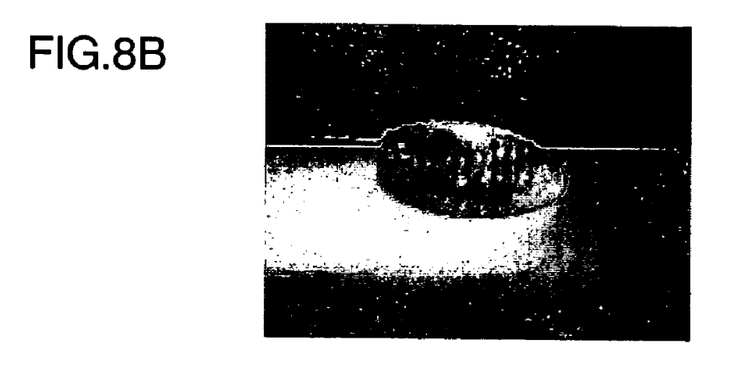

For about three minutes, the Cytop material was put in the dry furnace in which heated air of 180 degrees centigrade flowed. As a result, the Cytop material was so softened that the Cytop material was able to be twisted and bent. Since the thickness of the Cytop material was only 10 mm, the press molding by using the mold heated to 70 degrees centigrade was performed on three Cytop materials put on top of each other as shown in FIG. 8A. As a result, a groove shape as shown in FIG. 8B was transferred.

3. ZEONEX

Figure 9A:
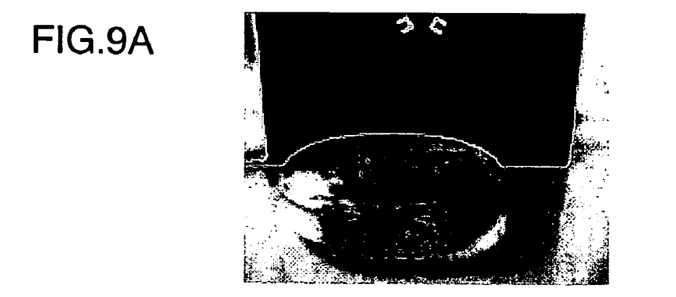
FIGS. 9A through 9D are photographs showing appearances of ZEONEX materials.
Figure 9B:
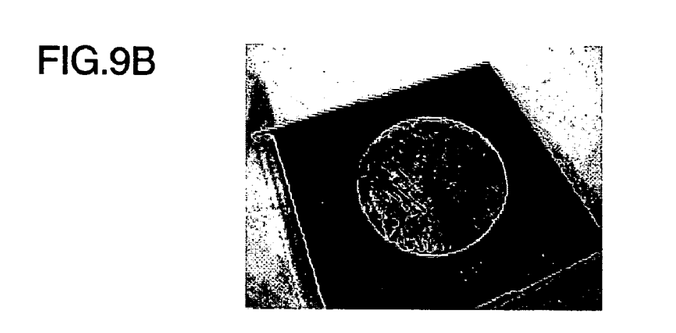
Figure 9C:
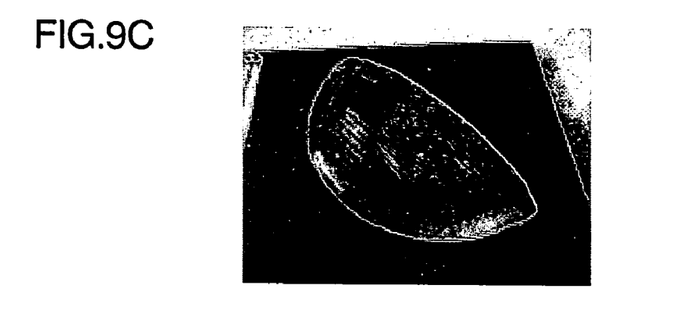
Figure 9D:
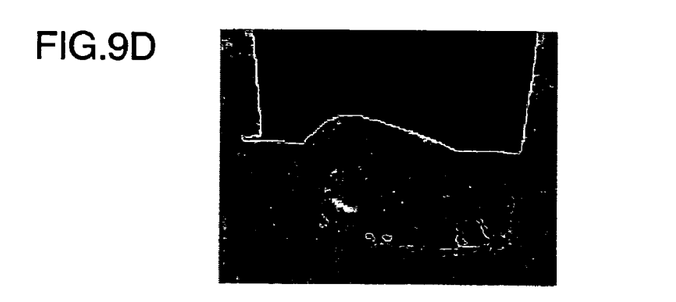

Pellets of ZEONEX were put in a heat insulation glass beaker, and melted in the vacuum dry furnace, and was then solidified. The thus-solidified ZEONEX material was used for the hot press molding experiment. Further, the test ZEONEX material having a thickness of 10 mm that was cut off from a round bar was used for annealing experiment. In the dry furnace in which heated air of 180 degrees centigrade flowed, the annealing process for 100 minutes was performed on the ZEONEX material cut off from the round bar. As a result, the surface of the ZEONEX material was softened, but the inside middle part of the ZEONEX material was not softened, so that the crack was generated when the press molding was performed on the ZEONEX material. In addition, foam was generated on the ZEONEX material. Next, the annealing process for 100 minutes was performed on the ZEONEX material in the dry furnace in which heated air of 240 degrees centigrade flowed. As a result, the ZEONEX material became completely fluid. FIGS. 9C and 9D are photographs of the ZEONEX material folded like a waffle, showing the softness of the material. However, also in this case, foam was generated on the ZEONEX material. It was difficult to soften the ZEONEX material, and a condition for suppressing the foam was not found. The ZEONEX material had elasticity like acryl, and did not become soft like rubber.

Figure 10A:
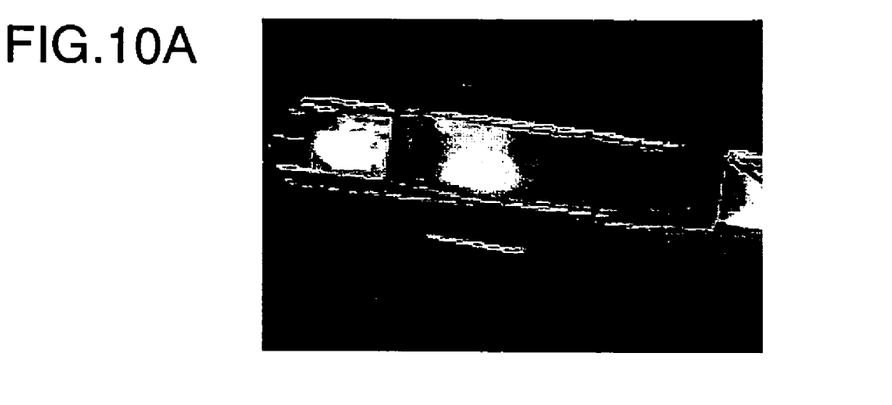
FIGS. 10A, 10B and 10C are photographs showing the ZEONEX material before and after pressing.
Figure 10B:
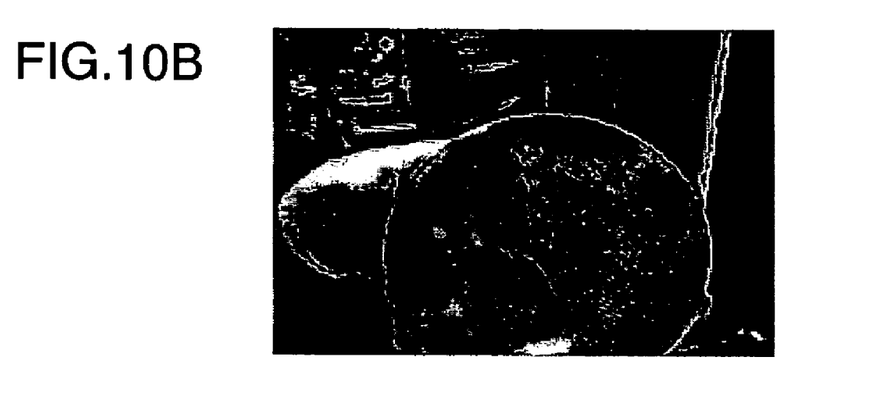
Figure 10C:
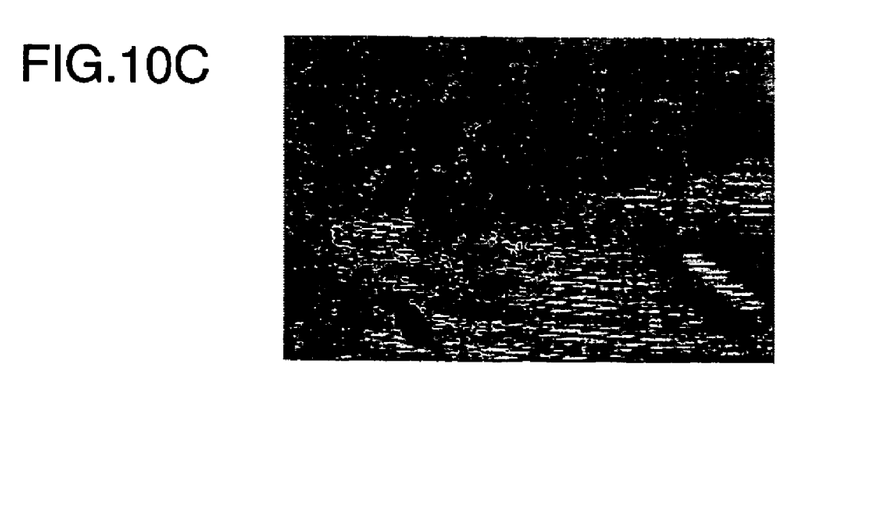

The press transfer was performed in accordance with a melting speed of the resin. Since the falling speed of the upper mold was not controlled, the press transfer was performed depending on the speed at which oil was discharged by oil pressure applied by the weight of the upper mold, while melting the material. As a result, the surface of the ZEONEX material became completely fluid like a hamburger, the groove transfer was good, and the transparency was maintained as shown in FIGS. 10A, 10B and 10C. However, foam was generated. It was understood that adjusting of the mold falling speed and the control of the cooling speed were important.

Thus, it was confirmed from the second example that the molding of the material other than PMMA (polymethylmethacrylate) was difficult, and PMMA was particularly suitable to the molding.

The present invention is not limited to the above-described embodiment, and various modifications can be made without departing from the scope of the present invention. For example, the present invention can be applied to a general manufacturing method of the double-sided Fresnel lens other than the method in which a plurality of tablet slice segment lenses are manufactured and assembled into the double-sided Fresnel lens. Further, in the present invention, instead of the upper and lower molds located at the upper and lower positions, the pressing may be carried out in the horizontal direction.

According to the manufacturing method and apparatus of the present invention, the upper mold 11 has the upper transfer surface 11*a* and the lower transfer surface 12*a* that engage the upper surface and the lower surface of the resin plate 7 for the tablet slice segment lens 3, respectively. With this structure, the transparent thermoplastic resin plate 7 is pressed by the upper mold 11 and the lower mold 12 so that the resin plate 7 can be curved. At the same time, the both-side lens surfaces 5 and 6 of the segment lens 3 can be transferred to the upper surface and the lower surface of the resin plate. In this manner, it is possible to efficiently manufacture the tablet slice segment lens that constitutes a large, double-sided, curved Fresnel lens.

The thermoplastic resin plate 7 held at a temperature higher than the softening temperature of the resin plate 7 and lower than the melting temperature of the resin plate 7 is pressed by a predetermined pressure. Thereby, surface roughness becomes small, so that the high transparency can be obtained. Further, it is possible to achieve highly precise molding, obtaining high performance lens function.

Furthermore, according to the manufacturing method and apparatus, compared to the conventional three-axis numerical value control machining, the rotary table 16 can be rotated around the axis C at a high speed, so that a speed of machining the mold can be raised to a speed higher than several meters per minute while maintaining high precision. Thereby, it is possible to fabricate the mold that has the machined mirror finished roughness of about Ry 100 nm.

According to the present invention, the heated and softened thermoplastic resin is pressed by using the press mold for a double-sided Fresnel lens. Thereby, it becomes possible to easily manufacture the doube-sided Fresnel lens that was conventionally difficult. A double-sided Fresnel lens that can be manufactured by the present invention includes a circular, flat-plate-shaped Fresnel lens having a homogeneous thickness and a concentric groove, a Fresnel lens having a curved surface, a Fresnel lens having an inhomogeneous thickness, a Fresnel lens segment having only a part of a concentric groove, the combination of these Fresnel lenses, i.e., a Fresnel lens segment having a curved surface and an inhomogeneous thickness, and various complicated Fresnel lenses. According to the present invention, even a large Fresnel lens of which complete size is difficult to manufacture can be manufactured by fabricating divided segment lenses and bonding segment lenses, for example.

Thus, according to the manufacturing method and apparatus for a large, double-sided, curved Fresnel lens, with high precision, it is possible to mold a highly transparent tablet slice segment lens that constitutes the large, double-sided, curved Fresnel lens, and to achieve high performance lens function.

What is claimed is:

1. A method of manufacturing a large double-sided curved Fresnel lens, comprising;
   a machining step (A) of performing ultra-precise three-dimensional machining on a first material to make an upper mold having an upper transfer surface that engages an upper surface of a thermoplastic resin plate, and performing ultra-precise three-dimensional machining on a second material to make a lower mold having a lower transfer surface that engages a lower surface of the thermoplastic resin plate; and
   a hot press molding step (B) of pressing the thermoplastic resin plate between the upper and lower molds by a predetermined pressure with the resin plate being held at a temperature higher than a softening temperature thereof and lower than a melting temperature thereof so that the thermoplastic resin plate is curved, and both lens surfaces for the double-sided Fresnel lens are respectively transferred to the upper surface and the lower surface of the thermoplastic resin plate,
   wherein in the machining step (A), each of the materials for the upper and lower molds is rotated around a rotational axis parallel to an optical axis of the large double-sided curved Fresnel lens at a high speed, and a position of a machining tool for the material is numerically controlled in first and sec.on.d directions orthogonal to the rotational axis and in a third direction parallel to the rotational axis so as to form the upper transfer surface and the lower transfer surfaces.

2. The method according to claim 1, wherein in the machining step (A), shapes of back sides of the double-sided Fresnel lens are respectively formed in the upper transfer surface and the lower transfer surface approximately in a direction parallel to the rotational axis.

3. An apparatus to manufactures a large double-sided Fresnel lens, comprising:
   molds each having a Fresnel facet for the large double-sided Fresnel lens;
   a press machine that simultaneously presses both surfaces of a thermoplastic resin plate by the molds with the thermoplastic resin plate being held at a temperature higher than a softening temperature thereof and lower than a melting temperature thereof;
   mold frames to which the molds are fixed, respectively;
   a stroke guide that guides a press stroke in an optical direction of the Fresnel lens such that the molds move to and from each other in the optical direction; and
   a stroke limiter that controls the press stroke.

4. The method according to claim 1, further comprising the step of
   providing an apparatus that manufactures a mold for a large-double-sided curved Fresnel lens, the apparatus comprising:
   i. a rotary table that is rotated around a rotational axis parallel to an optical axis of the large double-sided curved Fresnel lens at high speed;
   ii. a machining tool that machines a mold material placed on the rotary table; and
   iii. an ultra-precise machining device that numerically controls a position of the machining tool in first and second directions orthogonal to the rotational axis and in a third direction parallel to the rotational axis,
   wherein the machining step (A) is performed using the machining tool of the apparatus to machine the first material to make the upper mold and to machine the second material to make the lower mold.

5. A method of manufacturing a large double-sided curved Fresnel lens, comprising;
   (a) performing ultra-precise three-dimensional machining on a first material to make an upper mold having an upper transfer surface that engages an upper surface of a thermoplastic resin plate, and performing ultra-precise three-dimensional machining on a second material to make a lower mold having a lower transfer surface that engages a lower surface of the thermoplastic resin plate; and
   (b) pressing the thermoplastic resin plate between the upper and lower molds by a predetermined pressure with the resin plate being held at a temperature higher than a softening temperature thereof and lower than a melting temperature thereof so that the thermoplastic resin plate is curved, and both lens surfaces for the double-sided Fresnel lens are respectively transferred to the upper surface and the lower surface of the thermoplastic resin plate,
   wherein in the machining step (A), each of the materials for the upper and lower molds is rotated around a rotational axis parallel to an optical axis of the large double-sided curved Fresnel lens at a high speed, and a position of a machining tool for the material is numerically controlled in first and second directions orthogonal to the rotational axis and in a third direction parallel to the rotational axis so as to form the upper transfer surface and the lower transfer surfaces.

6. The method according to claim 5, further comprising the step of
   (C) providing an apparatus that manufactures a mold for a large-double-sided curved Fresnel lens, the apparatus comprising:
   i. a rotary table that is rotated around a rotational axis parallel to an optical axis of the large double-sided curved Fresnel lens at high speed;
   ii. a machining tool that machines a mold material placed on the rotary table; and
   iii. an ultra-precise machining device that numerically controls a position of the machining tool in first and second directions orthogonal to the rotational axis and in a third direction parallel to the rotational axis,
   wherein the machining tool of the apparatus is used to machine the first material to make the upper mold and to machine the second material to make the lower mold.

* * * * *